(12) United States Patent
Kanda

(10) Patent No.: US 9,041,811 B2
(45) Date of Patent: May 26, 2015

(54) MONITORING SYSTEM, METHOD FOR MONITORING OBJECT ENTERING ROOM, AND COMPUTER READABLE STORAGE MEDIUM

(75) Inventor: Kenji Kanda, Yokohama (JP)

(73) Assignee: CANON KABUSHIKI KAISHA, Tokyo (JO)

( * ) Notice: Subject to any disclaimer, the term of this patent is extended or adjusted under 35 U.S.C. 154(b) by 1737 days.

(21) Appl. No.: 12/391,948

(22) Filed: Feb. 24, 2009

(65) Prior Publication Data

US 2009/0213221 A1   Aug. 27, 2009

(30) Foreign Application Priority Data

Feb. 25, 2008   (JP) ................................. 2008-043523

(51) Int. Cl.
| | | |
|---|---|---|
| *H04N 7/18* | (2006.01) | |
| *G08B 13/196* | (2006.01) | |
| *G07C 9/00* | (2006.01) | |

(52) U.S. Cl.
CPC ............ *H04N 7/186* (2013.01); *G07C 9/00158* (2013.01); *G08B 13/19645* (2013.01)

(58) Field of Classification Search
CPC ..................... G08B 13/19645; G07C 9/00126; H04N 7/186
USPC ......................................... 348/156, 143, 159
See application file for complete search history.

(56) References Cited

U.S. PATENT DOCUMENTS

| | | | | |
|---|---|---|---|---|
| 5,907,352 A * | 5/1999 | Gilley | ........................... | 348/151 |
| 6,011,901 A * | 1/2000 | Kirsten | ........................ | 386/226 |
| 6,570,498 B1 * | 5/2003 | Frost et al. | ..................... | 340/540 |
| 7,428,985 B1 * | 9/2008 | Moreland et al. | ............. | 235/379 |
| 7,529,485 B2 * | 5/2009 | Farmer et al. | .................... | 398/72 |
| 7,952,609 B2 * | 5/2011 | Simerly et al. | ................ | 348/143 |
| 8,068,006 B2 * | 11/2011 | Martin | ........................... | 340/5.7 |
| 2002/0071033 A1 * | 6/2002 | Gutta et al. | .................... | 348/143 |
| 2003/0108334 A1 * | 6/2003 | Nevenka et al. | ................ | 386/95 |
| 2003/0218542 A1 * | 11/2003 | Barendt | ..................... | 340/545.1 |
| 2006/0066440 A1 * | 3/2006 | Yeh | ............................. | 340/5.61 |
| 2008/0036862 A1 * | 2/2008 | Lang et al. | .................... | 348/156 |
| 2008/0092610 A1 * | 4/2008 | Kuo et al. | ....................... | 70/264 |

(Continued)

FOREIGN PATENT DOCUMENTS

| | | |
|---|---|---|
| JP | 08-077479 A | 3/1996 |
| JP | 10-222773 | 8/1998 |

(Continued)

OTHER PUBLICATIONS

Acharya, Binaya et al., "A Web-Enabled Distributed Door Entry System" 2001, Proceedings of the 2001 American Society for Engineering Education Annual Conference & Exposition. 7 pages.*

Japanese Office Action for corresponding patent application JP2008-043523.

*Primary Examiner* — Douglas Blair

(74) *Attorney, Agent, or Firm* — Carter, DeLuca, Farrell & Schmidt, LLP

(57) ABSTRACT

An entry monitoring system to monitor an object entering a room includes a door control apparatus configured to control opening of a door, and a monitoring apparatus configured to monitor the object entering the room by an image capturing apparatus. The door control apparatus controls the door to open when the image capturing apparatus completes preparation for capturing images of the object entering the room.

19 Claims, 6 Drawing Sheets

(56) References Cited

U.S. PATENT DOCUMENTS

| | | | |
|---|---|---|---|
| 2009/0051545 A1* | 2/2009 | Koblasz | 340/573.1 |
| 2009/0252302 A1* | 10/2009 | Monroe | 379/37 |
| 2010/0111377 A1* | 5/2010 | Monroe | 382/118 |
| 2012/0206605 A1* | 8/2012 | Buehler et al. | 348/159 |

FOREIGN PATENT DOCUMENTS

| | | |
|---|---|---|
| JP | 2001-40923 | 2/2001 |
| JP | 2007-208659 | 8/2007 |

* cited by examiner

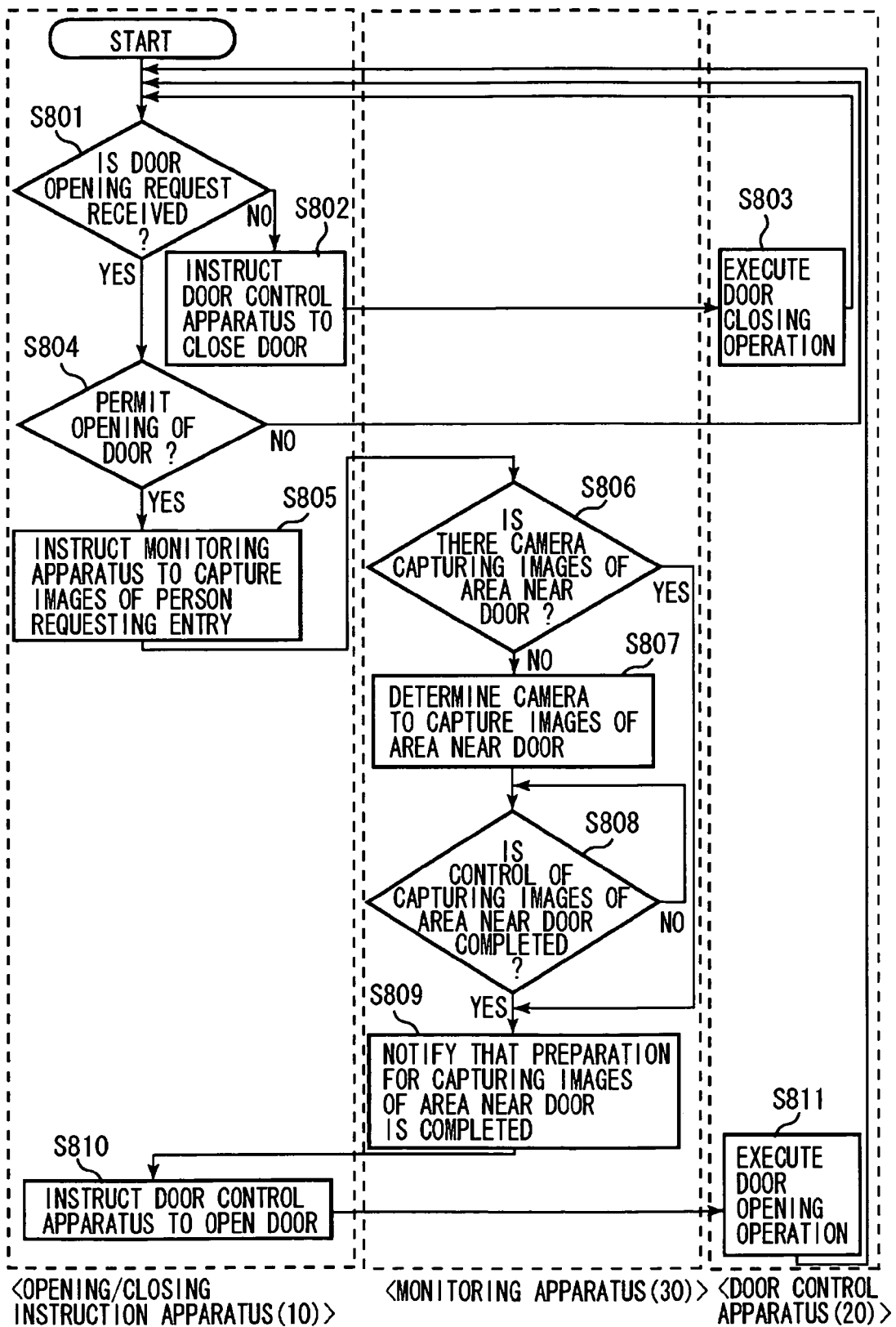

MONITORING SYSTEM, METHOD FOR MONITORING OBJECT ENTERING ROOM, AND COMPUTER READABLE STORAGE MEDIUM

BACKGROUND OF THE INVENTION

1. Field of the Invention

The present invention generally relates to a monitoring system, a method for monitoring an object entering a room, and a computer readable storage medium therefor.

2. Description of the Related Art

Conventionally, to manage entry and prevent a crime, utilization of a monitoring camera, authentication using features of a living body to identify an individual (e.g., biometric authentication), authentication by an integrated circuit (IC) card (e.g., IC card authentication) or the like, has been proposed and used.

As an example of an entry monitoring system that executes entry monitoring using an authentication apparatus for executing biometric authentication, IC card authentication, or the like, in conjunction with a monitoring camera for monitoring an action after entry, the following technique is discussed.

Japanese Patent Application Laid-Open No. 10-222773 discusses a system that executes door opening control by an authentication apparatus, and after the execution of the opening control, an operation of a camera is started to execute a tracking operation.

In the above-described conventional system, it may be the case that a monitoring camera inside a room may not be in a position that enables capturing of a person entering a room when a door is opened. In such a situation, it may be difficult to satisfactorily track the person from the moment when the person has passed through the door. Thus, it can occur that the sight of the person may be lost.

For example, in the system discussed in Japanese Patent Application Laid-Open No. 10-222773, a tracking camera is activated when the door is unlocked. However, depending on a capturing range and operating position of the camera, a time lag may occur before the person entering the room is tracked. Thus, an object to be monitored may be lost after entry.

For example, in the conventional entry monitoring system, it can be difficult to accurately start monitoring of an object to be monitored (e.g., a photographic object) by a monitoring camera (e.g., an image capturing apparatus) from the moment when the object to be monitored has entered. Accordingly, it can occur that the object to be monitored may be lost.

SUMMARY OF THE INVENTION

According to one aspect of the present invention, an entry monitoring system is provided to monitor an object entering a room. The entry monitoring system includes a door control apparatus configured to control opening of a door, and a monitoring apparatus configured to monitor the object entering the room by an image capturing apparatus. The door control apparatus controls the door to open the door when the image capturing apparatus completes preparation for capturing images of the object entering the room.

According to another aspect of the invention, a door control apparatus is provided that is configured to control opening of a door. The door control apparatus includes a determination device configured to perform a determination as to whether an image capturing apparatus has completed preparation for capturing images of an object entering a room, and a control device configured to control opening of the door in response to the determination by the determination device.

According to yet another aspect of the invention, an entry monitoring system is provided having a door opening instruction apparatus, a door control apparatus, and a monitoring apparatus configured to monitor an object entering a room with an image capturing apparatus. The door opening instruction apparatus is configured to instruct the door control apparatus to open a door, and the door control apparatus is configured to control opening of the door in response to a door opening instruction from the door opening instruction apparatus. The door opening instruction apparatus includes a capturing instruction device configured to instruct the monitoring apparatus to capture images of the object entering the room, and a door opening instruction device configured to instruct the door control apparatus to open the door after notification of completion of preparation for capturing images of the object from the monitoring apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 8 is a flowchart illustrating an example of a processing procedure in an entry monitoring system according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
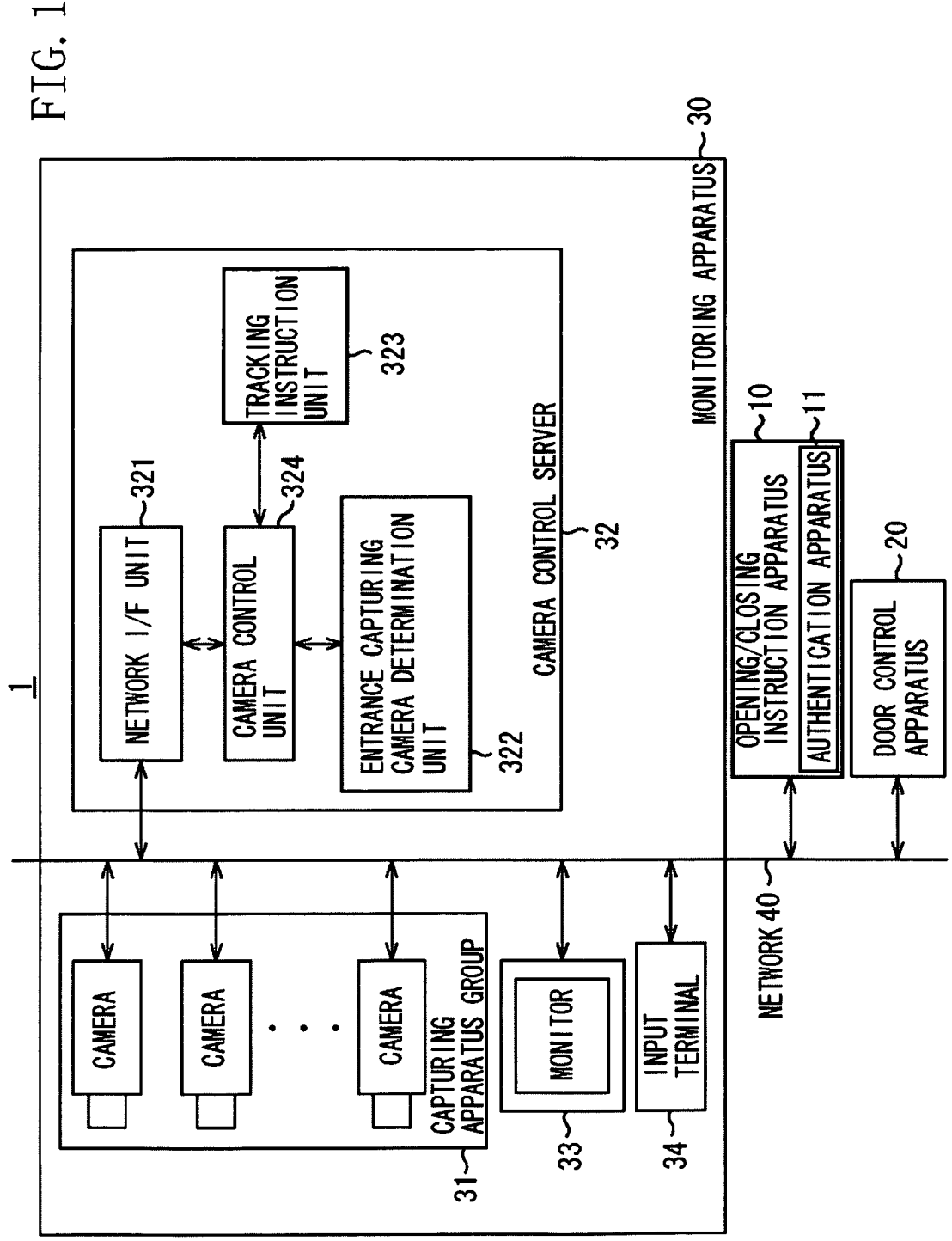
FIG. 1 is a block diagram illustrating an example of a configuration of an entry monitoring system according to an exemplary embodiment of the present invention.

FIG. 1 is a block diagram illustrating an example of a system configuration of an entry monitoring system 1 according to an exemplary embodiment of the present invention.

The entry monitoring system 1 according to this embodiment includes an opening/closing instruction apparatus 10, a door control apparatus 20, a monitoring apparatus 30, and a network 40.

According to the embodiment as shown, the opening/closing instruction apparatus 10 includes an authentication apparatus 11. The opening/closing instruction apparatus 10 determines whether to open or close a door in response to an opening and/or closing request of the door from a person who requests to enter a room, based on an authentication result of the authentication apparatus 11, and instructs the door control apparatus 20 to either open or close the door.

The door control apparatus 20 according to this embodiment executes control of opening and/or closing of the door in response to an instruction for opening and/or closing the door from the opening/closing instruction apparatus 10. Herein, the door that is opened and/or closed under control of the door control apparatus 20 defines a separation between an inside and an outside of the room.

The monitoring apparatus 30 according to this embodiment monitors an object to be monitored which enters the room through the door. The monitoring apparatus 30 includes an image capturing apparatus group 31, a camera control server 32, a monitor 33, and an input terminal 34.

The image capturing apparatus group 31 according to this embodiment includes a plurality of cameras, and captures one or more images of the object to be monitored which enters the room through the door. An image capturing apparatus may also be one camera. Each camera included in the image capturing apparatus group 31 may be independently connected to the network 40, and may function as a network camera which can perform, for example, pan tilt zoom control (PTZ control), or the like, in communication with the outside.

The camera control server 32 according to this embodiment communicates with, for example, the cameras of the image capturing apparatus group 31 via the network 40 and centrally controls operation of the cameras. The camera control server 32 can include, for example a network interface (I/F) unit 321, an entrance capturing camera determination unit 322, a tracking instruction unit 323, and a camera control unit 324.

The network I/F unit 321 may transmit PTZ control data from the camera control unit 324 to one or more of the cameras of the image capturing apparatus group 31, and may receive event data from the cameras. The entrance capturing camera determination unit 322 determines a camera which captures one or more images of (i.e., monitors) an area near an entrance door, among the cameras of the image capturing apparatus group 31, in response to a request from the outside (for example, a request from the input terminal 34). When the camera has been determined by the entrance capturing camera determination unit 322, the camera control unit 324 may transmit control data to the camera via the network I/F unit 321. The tracking instruction unit 323 may provide one or more instructions to execute the PTZ control of cameras, for example, to track the object, which may be a moving object. The camera control unit 324 may control the entire camera control server 32.

The monitor 33 is a display apparatus, which may, for example, enable an administrator to view an image captured by the camera. The input terminal 34 may enable the administrator to input an instruction to the camera control server 32, for example, to control the camera.

In the entry monitoring system 1 according to the embodiment as shown, the opening/closing instruction apparatus 10, the door control apparatus 20, the cameras of the image capturing apparatus group 31, the camera control server 32, the monitor 33, and the input terminal 34 are communicably connected with each other via the network 40. More specifically, these apparatuses are connected with each other via the network 40 and may, for example, mutually transmit data by packet communication.

In the present exemplary embodiment, it is assumed that the network 40 is formed by a transmission control protocol/internet protocol (TCP/IP) network, but the network 40 is not limited to such as TCP/IP network. For example, with respect to communication between the opening/closing instruction apparatus 10 and the door control apparatus 20, a Wiegand interface, which is an international standard in an interface between security apparatuses, can also be employed.

Figure 2:
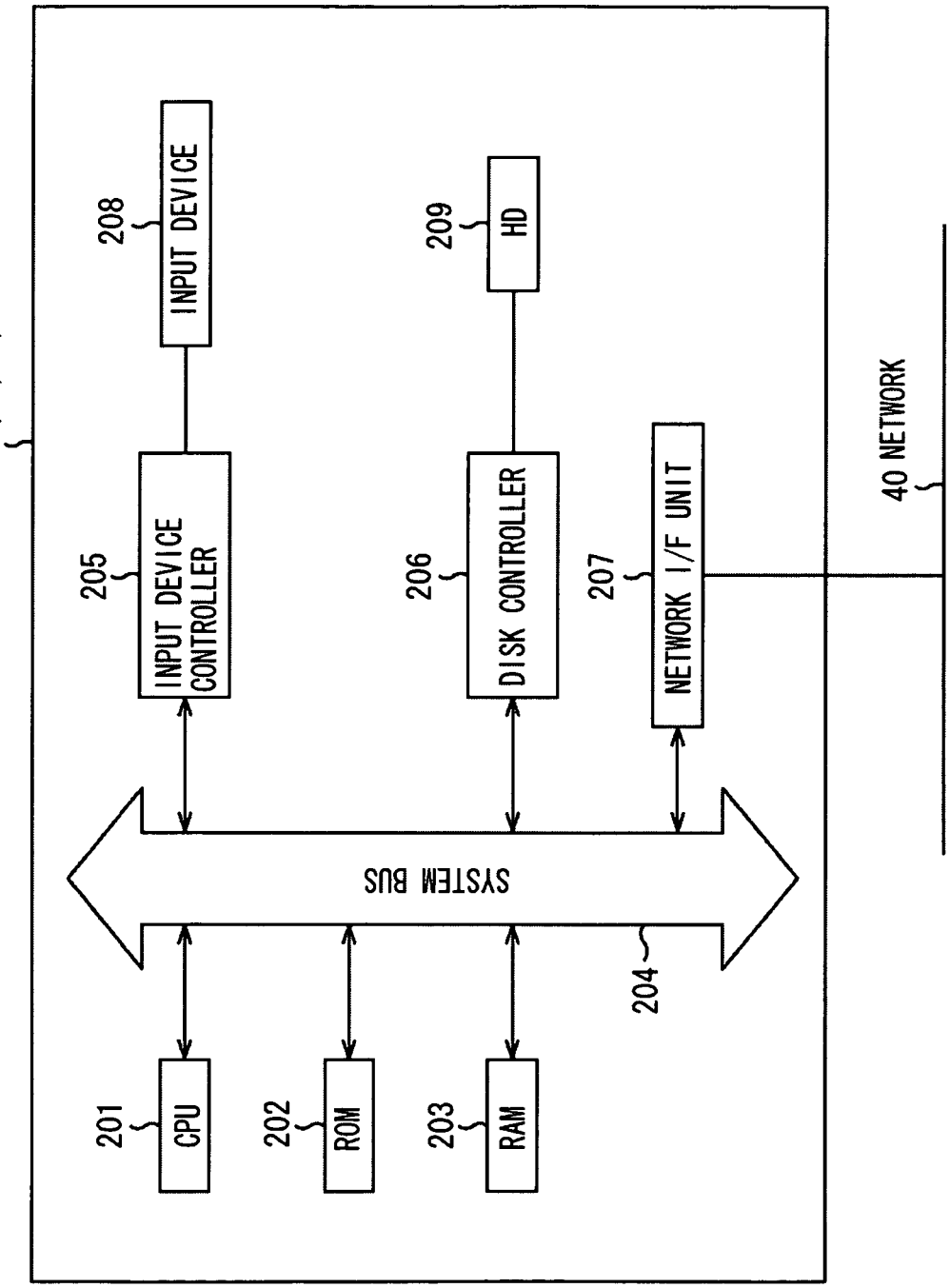
FIG. 2 a block diagram illustrating an example of a hardware configuration of a camera control server (alternatively, an opening/closing instruction apparatus or a door control apparatus) according to an exemplary embodiment of the present invention.

FIG. 2 is a block diagram illustrating an example of a hardware configuration of the embodiment of the camera control server 32 illustrated in FIG. 1.

In the example as shown in FIG. 2, a central processing unit (CPU) 201 executes a program which is stored in at least one of a read only memory (ROM) 202 and a hard disk (HD) 209 which is a storage device, and may also collectively control each device (202, 203, 205, 206, and 207) that is connected to a system bus 204.

The ROM 202 may store setting data of its own device, a boot program (i.e., a start-up program to start operation of its own device) and the like.

A random access memory (RAM) 203 may provide areas to temporarily store a program and data which are loaded from the HD 209 and the ROM 202, or received from other apparatuses via a network I/F unit 207. Further, the RAM 203 can provide various other kinds of areas, such as a work area in which the CPU 201 may execute various kinds of processing.

The system bus 204 according to the example as shown communicably connects each of the devices (201, 202, 203, 205, 206 and 207).

An input device controller 205 can control input of a signal which is input from an input device 208 to each device via the system bus 204.

A disk controller 206 may read a program and data that is stored in the HD 209 and executed by the CPU 201 to cause an operating system (OS) and its own device to execute each process, which will be described below. That is, the disk controller 206 may load the program and data stored in the HD 209 into the RAM 202 according to control by the CPU 201. Further, the disk controller 206 may optionally write data processed by the CPU 201 into the HD 209.

The network I/F unit 207 may execute data communication with other apparatuses (e.g., external apparatuses) via the network 40.

In the embodiment of the camera control server 32 illustrated in FIG. 1, the entrance capturing camera determination unit 322, the tracking instruction unit 323 and the camera control unit 324 may be configured by, for example, a program having computer-executable instructions stored in the CPU 201 and the HD 209 as illustrated in FIG. 2. Furthermore, in the embodiment of the camera control server 32 illustrated in FIG. 1, the network I/F unit 321 corresponds to the network I/F unit 207 illustrated in the example of FIG. 2.

The camera control server 32 in FIG. 2 illustrates an example of a configuration which includes the input device 208 inside camera the control server 32. However, a function of the input device 208 can also be configured as, for example, the input terminal 34 illustrated in FIG. 1, and the input device 208 may optionally be omitted.

An example of the hardware configuration of the embodiment of the camera control server 32 was described above using FIG. 2. However, the opening/closing instruction apparatus 10 and the door control apparatus 20 as illustrated in FIG. 1 may also have a hardware configuration that is the same or similar to that illustrated in FIG. 2. In this case, the authentication apparatus 11 in the opening/closing instruction apparatus 10 illustrated in FIG. 1 may function as the input device 208 illustrated in the example of FIG. 2.

Figure 3:
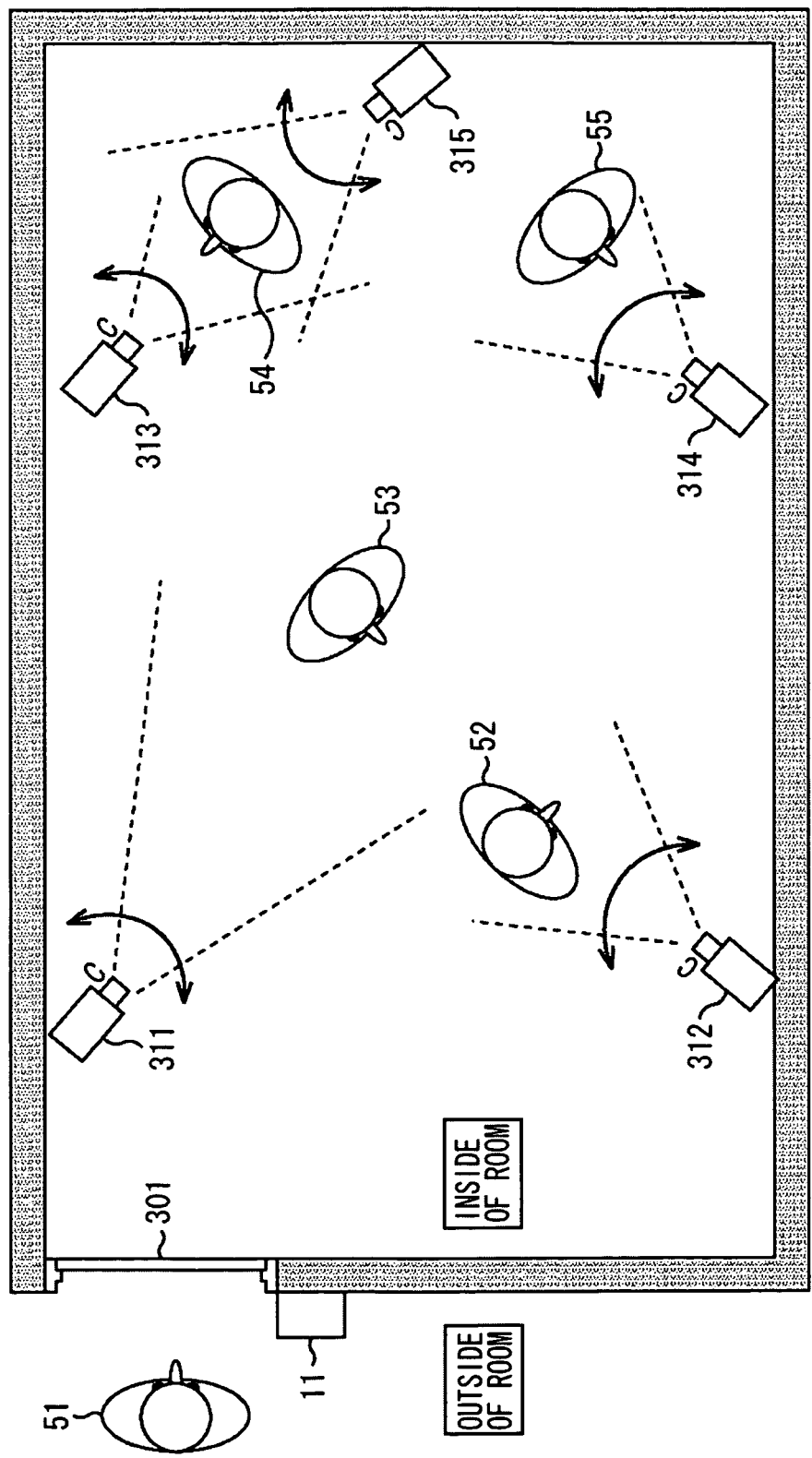
FIG. 3 is a general view illustrating an example of an entry monitoring system according to an exemplary embodiment of the present invention.

FIG. 3 is a general view illustrating the entry monitoring system 1 according to the present exemplary embodiment. The entry monitoring system 1 illustrated in FIG. 3 includes a door 301. The inside and the outside of a room are defined by the door 301 (i.e., the door separates the inside of the room from the outside of the room.)

Inside the room illustrated in FIG. 3, cameras 311, 312, 313, 314 and 315 are each installed at predetermined positions to provide the image capturing apparatus group 31. The monitoring apparatus 30 monitors each of persons 52, 53, 54 and 55 who are already in the room, in response to a moving situation and other preset monitoring conditions while the cameras transfer the tracking process between them. At this time, an existing technique may be used for transferring tracking processes between the cameras. For example, a method discussed in Japanese Patent Application Laid-Open No. 2007-208659 can be used.

Normally, the inside and the outside of the room are blocked from one another by the door 301. When a person requesting entry 51 from the outside intends to enter the room, the person requesting entry 51 may perform an authentication operation with the authentication apparatus 11 installed on the outside of the room. The door 301 may open only when it is permitted to open as a result of the authentication.

Next, operation of an embodiment of the entry monitoring system 1 as illustrated in FIG. 3 will be described. FIGS. 4 to 7 are schematic views illustrating examples of the operation of the embodiment of the entry monitoring system 1 illustrated in FIG. 3. Description will be given below in turn from FIG. 4.

Figure 4:
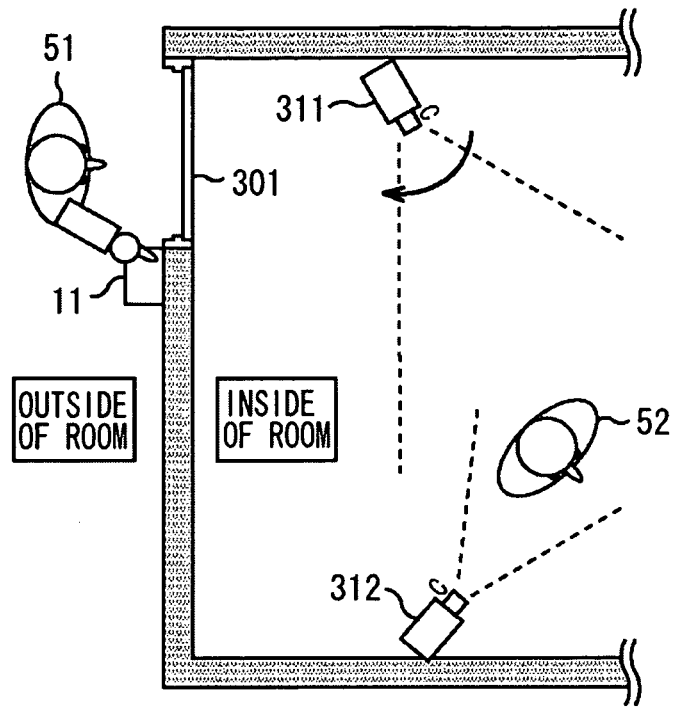
FIG. 4 is a schematic view illustrating an example of operation of the embodiment of the entry monitoring system illustrated in FIG. 3.

First, FIG. 4 illustrates a situation in which the person requesting entry 51 operates the authentication apparatus 11 to input a door opening request. In this example, before the door opening request is input, both of the cameras 311 and 312 inside the room are tracking and capturing images of the person 52 who is already in the room, as illustrated in FIG. 4. In response to issuance of the door opening request from the person requesting entry 51, the camera 311 starts changing its orientation to monitor and capture images of an area near the door 301.

Figure 5:
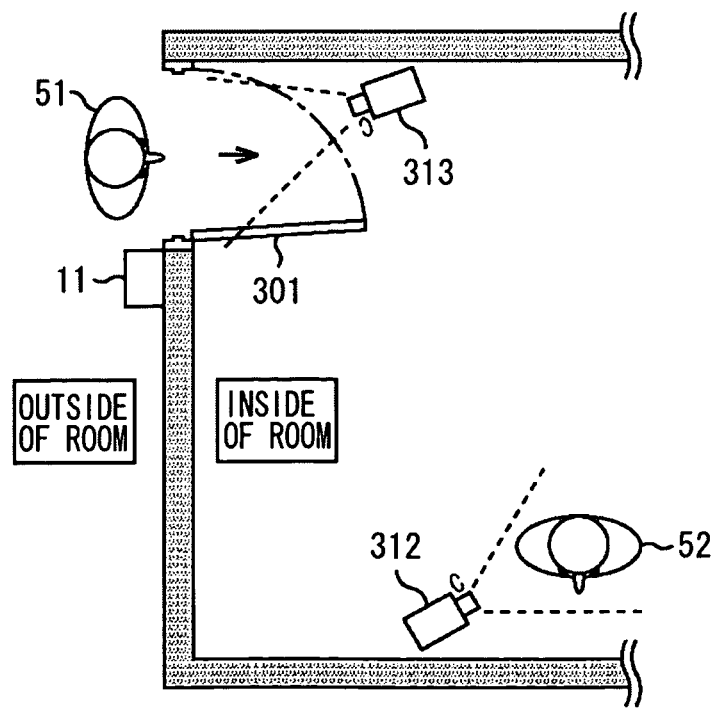
FIG. 5 is a schematic view illustrating an example of operation of the embodiment of the entry monitoring system illustrated in FIG. 3.

The opening of the door 301 is permitted by the authentication apparatus 11. Then, the camera 311 starts capturing images with the orientation for capturing images of the area near the door 301, and as illustrated in FIG. 5, the door 301 is opened and the person requesting entry 51 can enter the room. Since the camera 311 is capturing images of the area near the door 301 when the door 301 is opened, the monitoring of the person requesting entry 51 can be started relatively accurately, and image information that indicates features of a living body, for example to transfer a tracking operation between cameras inside the room, may be fairly easily acquired.

Figure 6:
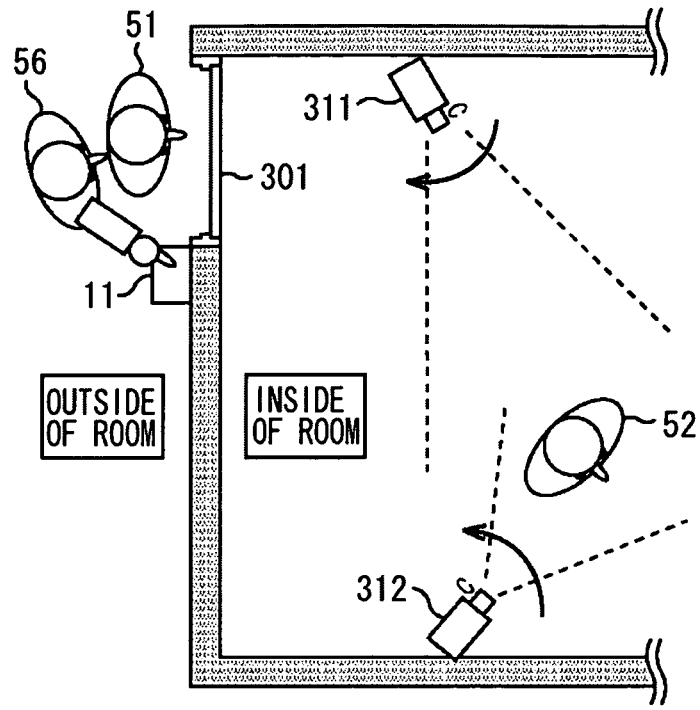
FIG. 6 is a schematic view illustrating an example of operation of the embodiment of the entry monitoring system illustrated in FIG. 3.
Figure 7:
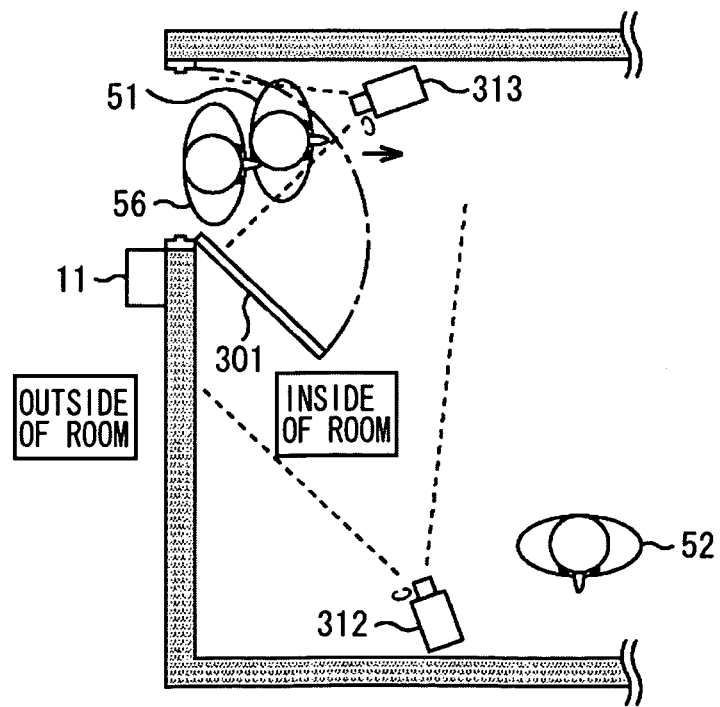
FIG. 7 is a schematic view illustrating an example of operation of the embodiment of the entry monitoring system illustrated in FIG. 3.

FIG. 6 illustrates a situation in which a person requesting entry 56 operates the authentication apparatus 11 to input the door opening request to enter the room together with the person requesting entry 51. As an authentication method for permitting a plurality of persons to simultaneously enter the room, an existing technique can be used. For example, a method discussed in Japanese Patent Application Laid-Open No. 2001-40923 can be used. According to this example, before the door opening request is input, both of the cameras 311 and 312 inside the room are tracking and capturing images of the person 52 who is already in the room, as illustrated in FIG. 6. In this case, in response to the issuance of the door opening request from the person requesting entry 56, the cameras 311 and 312 start changing their orientations to monitor and capture images of the area near the door 301.

The opening of the door 301 is permitted by the authentication apparatus 11. Then, both of the cameras 311 and 312 start capturing images with the orientation for capturing images of the area near the door 301, and as illustrated in the example shown in FIG. 7, the door 301 is opened and the persons requesting entry 51 and 56 can enter the room. Since the cameras 311 and 312 are monitoring and capturing images of the area near the door 301 when the door 301 is opened, both of the persons requesting entry 51 and 56 can be monitored fairly accurately. Thus, image information that indicates features of the living bodies, for example to transfer the tracking operation of the persons requesting entry 51 and 56 inside the room, may be relatively easily acquired. Furthermore, even if the paths of the persons requesting entry 51 and 56 become separated when moving in the room, tracking may be facilitated since the cameras 311 and 312 monitor each of persons requesting entry 51 and 56.

With respect to the person 52 who was being been tracked and having images captured by the cameras 311 and 312 inside the room before the door opening request was input by the person requesting entry 56, other cameras 313 to 315, as illustrated for example in FIG. 3, may be capable of executing the monitoring operation while transferring the tracking process in response to the moving situation of the person 52.

Next, an example of processing procedures of an entry monitoring method of the entry monitoring system 1 according to the present exemplary embodiment will be described.

FIG. 8 is a flowchart illustrating an example of the processing procedures of the entry monitoring method of the entry monitoring system 1 according to the exemplary embodiment of the present invention. The flowchart in FIG. 8 illustrates a series of a processing flow from reception of the door opening request by the person requesting entry outside the room to opening of an entrance door.

In a series of processes as illustrated in the example of FIG. 8, processing by the CPU 201 of the opening/closing instruction apparatus 10, processing by the CPU 201 of the door control apparatus 20 and processing by the CPU 201 of the monitoring apparatus 30 (e.g., camera control server 32), are executed interlockedly. At this time, the CPU 201 of the opening/closing instruction apparatus 10 executes, for example, a program stored in the HD 209 of its own device to execute processing in the opening/closing instruction apparatus 10 illustrated in FIG. 8. Similarly, the CPU 201 of the door control apparatus 20 executes, for example, a program stored in the HD 209 of its own device to execute processing in the door control apparatus 20 illustrated in FIG. 8. Similarly, the CPU 201 of the camera control server 32 executes, for example, a program stored in the HD 209 of its own device to execute processing in the monitoring apparatus 30 illustrated in FIG. 8.

Further, although not illustrated in the example of FIG. 8, each of the opening/closing instruction apparatus 10, the door control apparatus 20, and the monitoring apparatus 30 includes start processing and end processing. FIG. 8 illustrates an example of the processing flow during operation that is continued after the start processing of all apparatuses is completed.

First, when the processing example illustrated in FIG. 8 is started, the door 301 is in a closed state (closed door state).

In step S801, the CPU 201 of the opening/closing instruction apparatus 10 determines whether a door opening request is received from a person requesting entry outside a room, which person corresponds to a moving object to be monitored, via the authentication apparatus 11. The door opening request is issued when the person requesting entry executes an authentication operation with the authentication apparatus 11.

As a result of determination in step S801, when the door opening request is not received from the person requesting entry (NO in step S801), the processing proceeds to step S802. In step S802, the CPU 201 of the opening/closing instruction apparatus 10 transmits a door closing instruction for the door 301 to the door control apparatus 20.

In step S803, the CPU 201 of the door control apparatus 20 executes a door closing operation on the door 301 in response to the door closing instruction for the door 301 from the opening/closing instruction apparatus 10. In this case, the CPU 201 of the door control apparatus 20 controls the door 301 to maintain a closed state. When the processing in step S803 ends, the processing returns to step S801.

On the other hand, as a result of determination in step S801, when the door opening request is received from the person requesting entry (YES in step S801), the processing proceeds to step S804. In step S804, the CPU 201 of the opening/closing instruction apparatus 10 determines whether to permit opening the door 301 based on an authentication result from the authentication apparatus 11. More specifically, when the person requesting entry is authenticated by the authentication apparatus 11, it is determined that the door 301 is permitted to open. When the person requesting entry is not authenticated by the authentication apparatus 11, it is determined that the door 301 is not permitted to open (e.g., is prohibited to open).

At this time, the authentication process performed by the authentication apparatus 11, such as for example a biometric authentication, can be applied to the person requesting entry. Further, the authentication apparatus 11 may also employ other authentication methods such as authentication by, for example, at least one of an IC card and a method (i.e. authentication) that directly uses a result of automatic detection by an infrared sensor, for granting permission in opening of the door according to security requirements.

As a result of determination in step S804, when opening of the door 301 is not permitted (NO in step S804), the processing returns to step S801.

On the other hand, as a result in step S804, when opening of the door 301 is permitted (YES in step S804), the processing proceeds to step S805. In step S805, the CPU 201 of the opening/closing instruction apparatus 10 transmits an instruction for capturing images of the person requesting entry to the monitoring apparatus 30 (e.g., camera control server 32).

In step S806, the CPU 201 of the camera control server 32 determines whether a camera capturing images of an area near the door 301 is present, based on the instruction for capturing images of the person requesting entry that is issued from the opening/closing instruction apparatus 10.

More specifically, the processing in step S806 may be executed by a function of the entrance capturing camera determination unit 322 and the camera control unit 324, as in the embodiment shown in FIG. 1, in the CPU 201 of the camera control server 32. To elaborate, first, the entrance capturing camera determination unit 322 may check an image capturing state of each of a plurality of cameras which forms the capturing apparatus group 31, when the image capturing instruction is received in step S805, and may confirm whether a number of cameras capturing images of the area near the door 301 meets a number of the door opening requests. For example, the entrance capturing camera determination unit 322 may acquire information about at least one of a present image capturing direction (e.g., values of one or more of pan and tilt angles) and zoom magnification of the camera from each camera, and may determine whether these values are in a range of preset values for each of the cameras. Thus, it may be determined whether a camera is capturing images of the area near the door 301. Further, it can be determined how many of the cameras are directed to a capturing range. Then, the camera control unit 324 can determine that a camera capturing images of the area near the door 301 is present when the entrance capturing camera determination unit 322 confirms that the number of cameras capturing images of the area near the door 301 meets the number of the door opening requests. Alternatively, the camera control unit 324 can determine that a camera capturing images of the area near the door 301 is not present when the entrance capturing camera determination unit 322 confirms that the number of cameras capturing images of the area near the door 301 does not meet the number of the door opening requests.

When it is determined in step S806 that a camera capturing images of the area near the door 301 is not present (e.g., the number of cameras capturing images of the area near the door 301 does not meet the number of the door opening requests) (NO in step S806), the processing proceeds to step S807. When it is determined that a camera capturing images of the area near the door 301 is present (e.g., the number of cameras capturing images of the area near the door 301 meets or exceeds the number of door opening requests) (YES in step S806), the processing proceeds to step S809.

In step S807, the CPU 201 of the camera control server 32 determines a camera for capturing images of the area near the door 301.

For example, the processing in step S807 may be executed by the function of the entrance capturing camera determination unit 322 as shown in the embodiment in FIG. 1, in the CPU 201 of the camera control server 32. To elaborate, the entrance capturing camera determination unit 322 may determine one or more cameras for capturing images of the area near the door 301 from among the cameras of the image capturing apparatus group 31. The number of the cameras thus determined may also make up for the deficiency of cameras relative to the number of the door opening requests. The determination may be made based on a preset priority (e.g., at least one of an arrangement of cameras near door 301, and a monitoring condition in which the camera is not tracking any moving object).

In step S808, the CPU 201 of the camera control server 32 determines whether control over the one or more cameras that capture images of the area near the door 301 which are determined in step S807, is completed.

For example, the processing in step S808 may be executed by the function of the camera control unit 324 as shown in the embodiment in FIG. 1, in the CPU 201 of the camera control server 32. To elaborate, the camera control unit 324 may transmit control data (e.g., a control signal) concerning an instruction to secure an orientation for capturing images of the area near the door 301, to the one or more cameras determined by the entrance capturing camera determination unit 322 in step S807, via the network I/F unit 321. For example, it may be the case that one or more cameras determined by the entrance capturing camera determination unit 322 may already be oriented and configured to capture images of the area near the door 301, or as another example, it may be the case that one or more of the cameras may be oriented or otherwise configured to capture images away from the area near the door 301, and may need to be re-oriented and/or re-configured to capture images of the area near the door 301. Then, the camera control unit 324 may wait for event data (e.g., an event signal) from one or more of the cameras to which the control data has been transmitted, indicating completion of operations performed in response to the control data. Then, the camera control unit 324 may determine whether the control of the cameras to capture images of the area near the door 301, which were determined in step S807, is completed in response to whether the event data was received from all cameras to which the control data had been transmitted.

For example, generally, a network camera capable of performing the PTZ control can store a plurality of pieces of preset position information (e.g., pan tilt zoom values) in a memory. Therefore, by reading the position information for capturing images of the area near the entrance (e.g., door 301) from the memory before the camera is installed, control of the cameras capturing images of the area near the door 301 can be easily executed in response to an instruction for position control from the camera control server 32. Preset position information of each network camera for setting the vicinity of the door 301 to a capturing range may be stored in the memory on the side of the camera control server 32. Further, completion of control on the camera side, which is performed in response to a control instruction of a preset position, can be transmitted from the camera side as event data. Notification of the completion of control on the camera side may be provided, for example, to the opening/closing instruction apparatus 10 directly or via the camera control server 32.

As a result of the determination in step S808, when the control of the cameras to capture images of the area near the door 301, which are determined in step S807, is not completed (NO in step S808), the processing waits in step S808. For example, when the event data is not received from all cameras determined in step S807, the processing waits in step S808.

On the other hand, as a result of determination in step S808, when the control of the cameras to capture images of the area near the door 301, which are determined in step S807, is completed (YES in step S808), the processing proceeds to step S809. For example, when the event data is received from all cameras determined in step S807, the processing will proceed to step S809.

In step S809, the CPU 201 of the camera control server 32 transmits data notifying of completion of preparation of one or a plurality of cameras for capturing images of the area near the door 301 to the opening/closing instruction apparatus 10.

For example, the processing in step S809 may be executed by the function of the camera control unit 324 in the embodiment shown in FIG. 1 in the CPU 201 of the camera control server 32. To elaborate, the camera control unit 324 may transmit the data notifying of completion of preparation for capturing images of the area near the door 301 to the opening/closing instruction apparatus 10 via the network I/F unit 321.

In step S810, when the CPU 201 of the opening/closing instruction apparatus 10 receives the data notifying of completion of preparation for capturing the area near the door 301 from the monitoring apparatus 30, the CPU 201 of the opening/closing instruction apparatus 10 transmits a door opening instruction about the door 301 to the door control apparatus 20.

In step S811, the CPU 201 of the door control apparatus 20 executes door opening operation of the door 301 in response to the door opening instruction about the door 301 from the opening/closing instruction apparatus 10. When the processing in step S811 ends, the processing returns to step S801. As examples of the door opening operation of the door 301 in step S811, the door 301 may be opened or the door 301 may be unlocked to allow the person requesting entry to open the door 301.

If there is a plurality of the door opening requests of the door 301, and it is assumed that they are made at the same time, the door opening instruction may be transmitted only once from the opening/closing instruction apparatus 10 to the door control apparatus 20.

As described above, in the processing executed according to the procedures illustrated in the example of FIG. 8, when a person enters the room, the door 301 will be opened after any cameras inside the room become ready to capture images of the person who enters the room. Since monitoring with the image capturing camera can be relatively accurately started from when the person enters the room, it can prevent the sight of the person from being lost when the person enters the room, and the accuracy of tracking the person who enters the room can be improved.

A system to detect an entering person (e.g., the photographic object) by a sensor such as for example an optical sensor or a pressure sensitive sensor which is used in a general automatic door, can also be applied as an alternative to the embodiment of the authentication apparatus 11 in FIG. 1. In this case, in stead of steps S801 to S804 in FIG. 8, a processing to determine "Is sensor turned on?" is provided as a part of the processing of the opening/closing instruction apparatus 10. For example, the CPU 201 of the opening/closing instruction apparatus 10 may determine that the sensor is turned on, a person requesting entry may be detected to be close to the door 301, and the door 301 can be opened. After that, the processing proceeds to step S805.

In step S808 described above, as to control of a camera, the pan tilt zoom control (PTZ control) of a camera is mainly described. However, the processing in step S808 can also be applied to control operations such as at least one of automatic focusing control (AF control) and automatic exposure control (AE control) of a camera.

Completion of the AF control and AE control may also be important conditions to start monitoring at the time of entry with image capturing cameras. For example, if the AE control of the camera is not suitably adjusted, the object to be monitored may not be captured due to a change in brightness inside the room. Furthermore, if the inside of the room is extremely dark, a problem can arise in which the AF control becomes unstable. Therefore, it may also effective that completion of camera control in step S808 is determined by completion of the AF control and AE control of the cameras of the image capturing apparatus group 31.

As described above, according to the exemplary embodiment, monitoring of the object by the image capturing apparatus can be relatively accurately started from when the object enters the room. Therefore, the object which moves and enters the room can be prevented from being lost at the time of entry, and tracking accuracy of the object can be improved, so that total security can be enhanced.

As described above, the CPU 201 of each apparatus may execute computer-executable instructions, such as in a computer program, that are stored in the HD 209 of its own apparatus, and each step illustrated in FIG. 8 can be realized. Accordingly the computer-executable instructions and a computer readable storage medium (HD 209) which stores the instructions, are included as aspects of the present invention.

More specifically, the above-described computer-executable instructions may be provided to a computer from the storage medium, such as for example a compact disc read only memory (CD-ROM) which stores the program or via various transmission media. As storage media for storing the above-described program and/or computer-executable instructions, at least one of a floppy disk, a hard disk, a magnetic tape, a magneto-optical disk, a nonvolatile memory card, and the like, can be used in addition or as an alternative to the CD-ROM. Furthermore, as transmission media of the above-described computer-executable instructions and/or program, communication media in a computer network system (e.g., local area network (LAN), wide area network (WAN) such as internet, wireless communication network or the like) for propagating information in a carrier wave to supply the computer-executable instructions and/or program can be used. The communication media includes a wired line such as an optical fiber and a wireless line.

Furthermore, embodiments of the present invention are not limited to an aspect in which a computer executes a supplied program and/or computer-executable instructions to realize a function of each apparatus of the entry monitoring system 1 according to the present exemplary embodiment. In a case where a function of each apparatus of the entry monitoring system 1 according to the present exemplary embodiment is realized by the computer-executable instructions and/or program in association with an operating system (OS) running on a computer or other application software, the computer-executable instructions and/or program is included in aspects according to the present invention. Furthermore, in a case where all or a part of processing of the supplied program and/or computer-executable instructions is executed by a function expansion board or a function expansion unit of the computer, and the function of each apparatus of the entry monitoring system 1 according to the present exemplary embodiment is realized, the computer-executable instructions and/or program may be included in aspects according to the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-043523 filed Feb. 25, 2008, which is hereby incorporated by reference herein in its entirety.

What is claimed is:

1. An entry monitoring system to monitor an object entering an area, the entry monitoring system comprising:
   a door control apparatus configured to control opening of a door;
   a monitoring apparatus configured to monitor the object entering the area by one of a plurality of image capturing apparatuses; and
   a determination unit configured to determine whether an image capturing apparatus selected from the plurality of image capturing apparatuses is prepared to capture the object,
   wherein the door control apparatus controls the door to open the door when the image capturing apparatus selected from the plurality of image capturing apparatuses that have not been capturing the object completes preparation for capturing the object entering the area.

2. The entry monitoring system according to claim 1, wherein the door control apparatus opens the door upon completion of the preparation for capturing the object entering the area.

3. The entry monitoring system according to claim 1, wherein, when the door is locked, the door control apparatus unlocks the door upon completion of the preparation for capturing the object entering the area.

4. The entry monitoring system according to claim 1, further comprising:
   an instruction apparatus configured to instruct the door control apparatus to open the door,
   wherein the instruction apparatus instructs the monitoring apparatus to capture the object entering the area with the image capturing apparatus when the door is opened, and instructs the door control apparatus to open the door when notified of completion of the preparation for capturing the object entering the area by the monitoring apparatus.

5. The entry monitoring system according to claim 1, wherein the preparation for capturing the object is completed when the image capturing apparatus completes pan tilt zoom control concerning capturing the object entering the area.

6. The entry monitoring system according to claim 1, wherein the preparation for capturing the object is completed when the image capturing apparatus completes automatic focusing control concerning capturing the object entering the area.

7. The entry monitoring system according to claim 1, wherein the preparation for capturing the object is completed when the image capturing apparatus completes automatic exposure control for capturing the object entering the area.

8. The entry monitoring system according to claim 1, wherein when a plurality of objects are entering the area, the door control apparatus controls the door to open the door upon completion of the preparation for capturing the plurality of objects.

9. The entry monitoring system according to claim 1, wherein the monitoring apparatus determines the image capturing apparatus for capturing the object entering the area according to a predetermined priority.

10. A door control apparatus configured to control opening of a door, the door control apparatus comprising:
    a determination device configured to perform a determination as to whether an image capturing apparatus selected from a plurality of image capturing apparatuses capturing a first object in an area has completed preparation for capturing a second object entering the area; and
    a control device configured to control opening of the door in response to the determination by the determination device.

11. The door control apparatus according to claim 10, wherein the control device opens the door upon completion of the preparation for capturing the second object entering the area.

12. The door control apparatus according to claim 10, wherein, when the door is locked, the control device unlocks the door upon completion of the preparation for capturing the second object entering the area.

13. The door control apparatus according to claim 10, wherein when a plurality of objects are entering the area, the control device controls the door to open the door upon completion of preparation for capturing the plurality of objects.

14. An entry monitoring system comprising:
    a door opening instruction apparatus;
    a door control apparatus;
    a monitoring apparatus configured to monitor an object entering an area with one of a plurality of image capturing apparatuses; and a determination unit configured to determine whether an image capturing apparatus selected from the plurality of image capturing apparatuses is prepared to capture the object, wherein the door opening instruction apparatus is configured to instruct the door control apparatus to open a door, and the door control apparatus is configured to control opening of the door in response to a door opening instruction from the door opening instruction apparatus, and wherein the door opening instruction apparatus comprises:

a capturing instruction device configured to instruct the monitoring apparatus to capture the object entering the area; and a door opening instruction device configured to instruct the door control apparatus to open the door after notification of completion of preparation from the monitoring apparatus of an image capturing apparatus selected from the plurality of image capturing apparatuses capturing the object in the area for capturing a second object entering the area by the image capturing apparatus.

15. A method for controlling an entry monitoring system having a door control apparatus configured to control opening of a door, and a monitoring apparatus configured to monitor an object entering an area by one of a plurality of image capturing apparatuses, the method comprising:

determining whether the image capturing apparatus has completed preparation of an image capturing apparatus selected from the plurality of image capturing apparatuses capturing a first object in the area for capturing a second object entering the area by the image capturing apparatus; and controlling the door to open the door when it is determined that preparation for capturing the second object has been completed.

16. A method for controlling a door control apparatus that controls opening of a door, the method comprising:

determining whether an image capturing apparatus selected from a plurality of image capturing apparatuses capturing a first object in an area has completed preparation for capturing a second object entering the area; and controlling the door to open the door when it is determined that preparation for capturing the second object has been completed.

17. A method for controlling a door opening instruction apparatus in an entry monitoring system, the entry monitoring system having the door opening instruction apparatus configured to instruct a door control apparatus to open a door, the door control apparatus being configured to control opening of the door in response to a door opening instruction from the door opening instruction apparatus, and a monitoring apparatus configured to monitor an object entering an area with one of a plurality of image capturing apparatuses, the method comprising:

instructing the monitoring apparatus to capture the object entering the area;

determining whether an image capturing apparatus selected from the plurality of image capturing apparatuses capturing the object in an area has completed preparation for capturing a second object entering the area; and instructing the door control apparatus to open the door after notification of completion of preparation of an image capturing apparatus selected from the plurality of image capturing apparatuses capturing the object in the area for capturing the second object entering the area by the image capturing apparatus.

18. A non-transitory storage medium storing computer-executable instructions executed by a door control apparatus configured to control opening of a door, the storage medium comprising:

computer-executable instructions for determining whether an image capturing apparatus selected from the plurality of image capturing apparatuses capturing a first object in an area has completed preparation for capturing a second object entering the area; and computer-executable instructions for controlling the door to open the door when it is determined that preparation for capturing the second object has been completed.

19. A non-transitory computer-readable storage medium storing computer-executable instructions executed by a door opening instruction apparatus in an entry monitoring system, the entry monitoring system having the door opening instruction apparatus configured to instruct a door control apparatus to open a door, the door control apparatus being configured to control opening of the door in response to a door opening instruction from the door opening instruction apparatus, and a monitoring apparatus configured to monitor an object entering an area by one of a plurality of image capturing apparatuses, the computer readable storage medium comprising:

computer-executable instructions for instructing the monitoring apparatus to capture the object entering the area;

computer-executable instructions for determining whether an image capturing apparatus selected from the plurality of image capturing apparatuses capturing the object in an area has completed preparation for capturing a second object entering the area: and computer-executable instructions for instructing the door control apparatus to open the door after notification of completion of preparation of an image capturing apparatus selected from the plurality of image capturing apparatuses capturing the object in the area for capturing the second object entering the area by the image capturing apparatus.

* * * * *